United States Patent
Ku et al.

(10) Patent No.: US 7,896,949 B2
(45) Date of Patent: Mar. 1, 2011

(54) MEMBRANES FOR SEPARATION OF CARBON DIOXIDE

(75) Inventors: Anthony Yu-Chung Ku, Rexford, NY (US); James Anthony Ruud, Delmar, NY (US); Vidya Ramaswamy, Niskayuna, NY (US); Patrick Daniel Willson, Latham, NY (US); Yan Gao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 484 days.

(21) Appl. No.: 12/107,148

(22) Filed: Apr. 22, 2008

(65) Prior Publication Data

US 2008/0210087 A1 Sep. 4, 2008

Related U.S. Application Data

(63) Continuation-in-part of application No. 11/263,165, filed on Oct. 31, 2005, now Pat. No. 7,396,382.

(60) Provisional application No. 60/721,560, filed on Sep. 28, 2005.

(51) Int. Cl.
*B01D 71/02* (2006.01)
*B01D 67/00* (2006.01)

(52) U.S. Cl. .......................... 95/51; 427/244

(58) Field of Classification Search .............. 95/51; 96/4, 11; 55/523; 428/446, 332, 304.4; 427/180, 427/189, 244
See application file for complete search history.

(56) References Cited

U.S. PATENT DOCUMENTS

| | | | |
|---|---|---|---|
| 5,006,248 A | 4/1991 | Anderson et al. | |
| 5,096,745 A | 3/1992 | Anderson et al. | |
| 5,104,539 A | 4/1992 | Anderson et al. | |

(Continued)

FOREIGN PATENT DOCUMENTS

WO WO8900983 A1 2/1989

OTHER PUBLICATIONS

Yang et al., "A Study by In Situ Techniques of the Thermal Evolution of the Structure of a Mg-Al-CO3 Layered Double Hydroxide", Chemical Engineering Science, vol. 57, pp. 2945-2953, 2002.

(Continued)

*Primary Examiner*—Frank M Lawrence
(74) *Attorney, Agent, or Firm*—Mary Louise Gioeni

(57) ABSTRACT

Methods for separating carbon dioxide from a fluid stream at a temperature higher than about 200° C. with selectivity higher than Knudsen diffusion selectivity include contacting a porous membrane with the fluid stream to preferentially transport carbon dioxide. The porous membrane includes a porous support and a continuous porous separation layer disposed on a surface of the porous support and extending between the fluid stream and the porous support layer. The porous support comprises alumina, silica, zirconia, stabilized zirconia, stainless steel, titanium, nickel-based alloys, aluminum-based alloys, zirconium-based alloys or a combination thereof. Median pore size of the porous separation layer is less than about 10 nm, and the porous separation layer comprises titania, MgO, CaO, SrO, BaO, $La_2O_3$, $CeO_2$, $HfO_2$, $Y_2O_3$, $VO_z$, $NbO_z$, $TaO_z$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3 CeO_3$, $Li_2ZrO_3$, $Li_2SiO_3$, $Li_2TiO_3$, $Li_2HfO_3$, $A^4N^1_yO_z$, $Y_xN^1_yO_z$, $La_xN^1_yO_z$, $HfN^2_yO_z$, or a combination thereof;

wherein
A is La, Mg, Ca, Sr or Ba;
$A^1$ is La, Ca, Sr or Ba;
$A^2$ is Ca, Sr or Ba;
$A^3$ is Sr or Ba;
$A^4$ is Mg, Ca, Sr, Ba, Ti or Zr;
$N^1$ is V, Nb, Ta, Cr, Mo, W, Mn, Si or Ge;
$N^2$ is V, Mo, W or Si;
x is 1 or 2;
y ranges from 1 to 3; and
z ranges from 2 to 7.

20 Claims, 2 Drawing Sheets

U.S. PATENT DOCUMENTS

| | | | |
|---|---|---|---|
| 5,169,576 A | 12/1992 | Anderson et al. | |
| 5,415,891 A | 5/1995 | Liu et al. | |
| 5,611,931 A | 3/1997 | Liu et al. | |
| 7,572,318 B2 * | 8/2009 | Jadhav et al. | 95/45 |
| 2008/0134895 A1 * | 6/2008 | Ruud et al. | 96/9 |
| 2009/0107330 A1 * | 4/2009 | Gu | 95/55 |

OTHER PUBLICATIONS

An Estimate of Surface Mobility of CO2 on gamma-Alumina and MgO-Modified gamma-Alumina Above 500 K, Journal of Colloid and Interface Science, Article No. CS985576, vol. 204, pp. 217-218, 1998.

Horiuchi et al., "Effect of Added Basic Metal Oxides on CO2 Adsorption on Alumina at Elevated Temperatures", Applied Catalysis A: General, vol. 167, pp. 195-202, 1998.

Sekulic et al., "A Microporous Titania Membrane for Nanofiltration and Pervaporation", Advanced Materials, Communications, vol. 16, No. 17, pp. 1546-1550, Sep. 3, 2004.

* cited by examiner

MEMBRANES FOR SEPARATION OF CARBON DIOXIDE

CROSS REFERENCE TO RELATED APPLICATIONS

This application is a continuation-in-part of U.S. Ser. No. 11/263,165, filed on 31 Oct. 2005 now U.S. Pat. No. 7,396,382, which is a non-provisional of and claims priority from U.S. Provisional Patent Application Ser. No. 60/721,560, filed on Sep. 28, 2005. The entire contents of both applications is incorporated herein by reference.

STATEMENT REGARDING FEDERALLY SPONSORED RESEARCH AND DEVELOPMENT

This invention was made with Government support under contract number DOE NETL DE-FC26-05NT42451 awarded by the U.S. Department of Energy. The Government has certain rights in the invention.

BACKGROUND

The invention relates generally to methods for separating $CO_2$ from a fluid stream.

Combustion of fossil fuels for power generation accounts for about 40% of global anthropogenic $CO_2$ emissions. Concerns over the impact of these emissions have prompted interest in technologies for the economical capture of $CO_2$. Membranes are an attractive option for separation because they offer potential advantages in operating energy requirements and footprint, especially if they can operate at the higher temperatures encountered in power plants. Current efforts to develop $CO_2$-selective membranes focus on a number of approaches, including polymeric membranes which utilize a facilitated transport mechanism to transport $CO_2$ and porous inorganic membranes which use a surface transport mechanism. Porous ceramic membranes have intrinsic thermal stability and potential for high permeance. The challenge for this class of membranes has been increasing the $CO_2$ surface transport to a sufficiently high rate to achieve high selectivity under the operating conditions of interest.

Gas transport through porous membranes occurs through a number of mechanisms, including molecular sieving, Knudsen diffusion, and surface diffusion. Molecular sieving occurs when the pore size approaches the kinetic diameter of gas molecules, and is smaller than the kinetic diameter of the larger molecule. This results in much higher selectivities for the smaller molecule since one of the gas species is completely sieved out. In this regime, the pore diameter is typically sub-nanometer and transport tends to be an activated process, with the rate increasing exponentially with temperature. This effect is well documented in microporous silica membranes, which have been extensively studied for $H_2$ separations. For membranes with pores that are larger than the molecular size but smaller than the mean free path of the gas molecules, transport through the pores occurs by Knudsen diffusion. According to the kinetic theory of gases, the permeance scales inversely with both temperature and the square root of molecular weight. Consequently, selectivity is proportional to the square root of the molecular weight ratio of the gases and independent of temperature.

Surface transport of $CO_2$ through membranes has been demonstrated at room temperature in activated carbon, zeolites, and more recently in silica. (See, for example, M. B. Rao, S. Sircar. J. Membrane Sci. 85, 253 (1993); M. Hong, S. Li, J. L. Falconer, R. D. Noble. J. Memb. Sci., 307, 277 (2008); W. J. W. Bakker, F. Kapteijn, J. Poppe, J. A. Moulijn. J. Memb. Sci., 117 57 (1996); J.-H. Moon, H. Ahn, S.-H. Hyun, C.-H. Lee. Korean J. Chem. Eng., 21, 477 (2004) and C.-Y. Tsai, S.-Y. Tam, Y. Lu, C. J. Brinker. J. Membrane Sci., 169, 255 (2000).) The mechanism involves the surface diffusion of adsorbed $CO_2$ along the pore walls. $CO_2$ selectivity has been observed in cases when the surface transport of $CO_2$ outweighed the contribution from Knudsen diffusion. The $CO_2$-selective silica samples were prepared using a sol-gel method similar to that used to produce $H_2$-selective membranes, with one important difference—the addition of an organic molecule to the sol to act as a template for porosity. This molecule was incorporated into the film and eventually burned out to produce porosity suitable for substantial surface transport. Reverse $CO_2/H_2$ selectivity up to 7 at 40° C. for templated silica has been observed, but the effect diminishes with increasing temperature due to desorption of $CO_2$ from the pore walls. Recent efforts have focused on ways to improve selectivity through the incorporation of materials with greater $CO_2$ affinity, such as amine groups and basic oxides. It is also believed that a suitable material may retain substantial adsorbed $CO_2$ at higher temperatures leading to enhanced $CO_2$ transport and $CO_2$ selectivity at higher temperatures. To date, there have been some reports of membranes with slightly elevated $CO_2/N_2$ selectivities above 200° C., but these membranes suffer from either a decreasing $CO_2$ flux upon heating or contain pinhole defects which dominate the flow (W. J. W. Bakker, F. Kapteijn, J. Poppe, J. A. Moulijn. J. Memb. Sci., 117 57 (1996); Y.-K. Cho, K. Han, K.-H. Lee. J. Memb. Sci., 104, 219 (1995); K. Kusakabe, K. Ichiki, S. Morooka. J. Memb. Sci., 95, 171 (1994)) Also, since $N_2$ has a larger kinetic diameter than $CO_2$, some of the observed enhancement may be due to molecular sieving of $N_2$. We have previously shown that the $CO_2/H_2$ selectivity of silica membranes diminishes with increasing temperature due to reduction of $CO_2$ flux due to desorption of $CO_2$ from the pore walls.

Accordingly, there remains a need for membranes that can achieve $CO_2/H_2$ selectivity significantly higher than that achievable through Knudsen diffusion mechanisms at high temperatures.

BRIEF DESCRIPTION

It has been discovered that certain porous membranes, comprising a porous support layer and a continuous porous separation layer disposed on a surface of the porous support and extending between the fluid stream and the porous support layer, exhibit reverse selectivity in separation of $CO_2$ from $H_2$. Accordingly, in one aspect, the present invention relates to methods for separating carbon dioxide from a fluid stream at a temperature higher than about 200° C. with selectivity higher than Knudsen diffusion selectivity. The methods comprise contacting the porous membranes with the fluid stream to preferentially transport carbon dioxide. The porous support comprises alumina, silica, zirconia, stabilized zirconia, stainless steel, titanium, nickel-based alloys, aluminum-based alloys, zirconium-based alloys or a combination thereof. The porous separation layer comprises titania, MgO, CaO, SrO, BaO, $La_2O_3$, $CeO_2$, $HfO_2$, $Y_2O_3$, $VO_z$, $NbO_z$, $TaO_z$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$, $Li_2HfO_3$, $A^4N^1_yO_z$, $Y_xN^1_yO_z$, $La_xN^1_yO_z$, $HfN^2_yO_z$, or a combination thereof; wherein A is La, Mg, Ca, Sr or Ba; $A^1$ is La, Ca, Sr or Ba; $A^2$ is Ca, Sr or Ba; $A^3$ is Sr or Ba; $A^4$ is Mg, Ca, Sr, Ba, Ti or Zr; $N^1$ is V, Nb, Ta, Cr, Mo, W, Mn, Si or Ge; $N^2$ is V, Mo, W or Si; x is 1 or 2; y ranges from 1 to 3; and z ranges from 2 to 7. Median pore size of the porous separation layer is less than about 10 nm. Methods of the present invention may be used for high temperature removal of $CO_2$ from syngas streams for power generation, particularly in integrated water gas shift membrane reactors.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
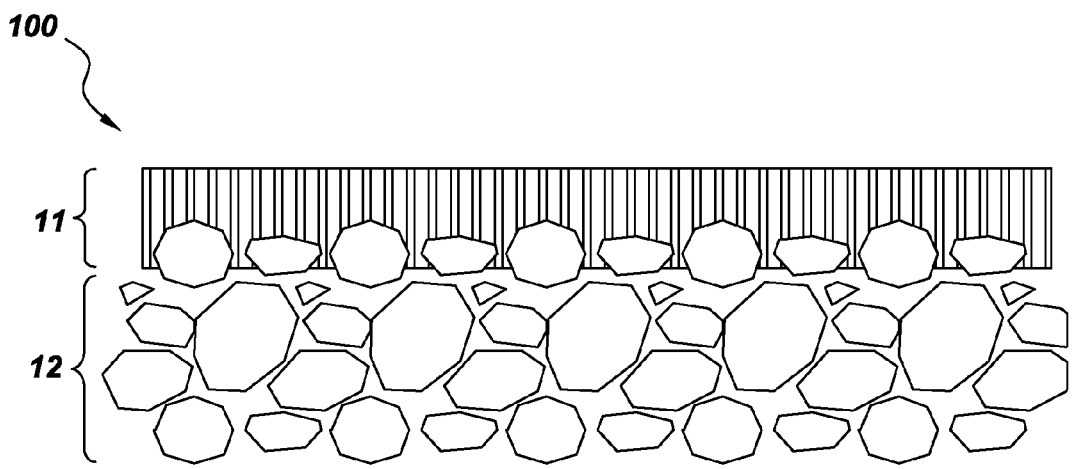
FIG. 1 is a cross-sectional view of a membrane having a separation layer disposed on the surface of a support layer.

FIG. 1 shows a cross-sectional view of a membrane according to one embodiment of the present invention. Membrane 100 includes support layer 11 and porous separation layer 12 disposed on the surface of support layer 11.

Support layer 11 is a porous structure that provides mechanical stability to the membrane. It typically has sufficient mechanical strength to sustain pressure gradients of at least 20 bar. Gas permeability of support layer 11 is at least two orders of magnitude larger than separation layer 12, and its $CO_2$ permeance is greater than $10^{-6}$ mol/m²/Pa/s at 200° C., and is at least ten times higher than the permeance of membrane 100. Support layer 11 is chemically stable in a $CO_2/H_2$ atmosphere, and is thermally stable, i.e., having no phase changes, up to about 500° C. It is composed of alumina, silica, zirconia, stabilized zirconia, metal(s), or a combination thereof. Suitable metals include stainless steel, titanium, nickel-based alloys, such as hastelloy and inconel, aluminum-based alloys, and zirconium-based alloys. In some embodiments, support layer 11 is composed of alumina.

Support layer 11 may include an intermediate layer (not shown) on the surface adjacent to separation layer 12. The intermediate layer provides additional mechanical stability to the membrane and can reduce surface roughness and facilitate fabrication of defect-free membranes, being free of macroscopic pore defects that allow bypass flow and having high surface area, a narrow pore size distribution, and a well-ordered pore organization. The intermediate layer is chemically stable in a $CO_2/H_2$ atmosphere and is thermally stable, i.e., there is no coarsening of the structure up to about 500° C. It is composed of alumina, silica, zirconia, stabilized zirconia, or a combination thereof; in some embodiments, the intermediate layer comprises alumina.

Figure 2:
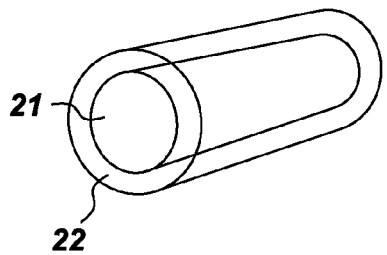
FIG. 2 is a schematic view of a single pore of the separation layer.

Porous separation layer 12 is a continuous porous layer extending between the fluid stream and the porous support layer. An intermediate layer may be disposed between porous separation layer 12 and porous support 11. FIG. 2 shows a single pore of porous separation layer 12, composed of pore 21 and pore wall 22.

Porous separation layer 12 is composed of titania, MgO, CaO, SrO, BaO, $La_2O_3$, $CeO_2$, $HfO_2$, $Y_2O_3$, $VO_z$, $NbO_z$, $TaO_z$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3\ CeO_3$, $Li_2ZrO_3$, $Li_2SiO_3$, $Li_2TiO_3$, $Li_2HfO_3$, $A^4N^1{}_yO_z$, $Y_xN^1{}_yO_z$, $La_xN^1{}_yO_z$, $HfN^2{}_yO_z$, or a combination thereof; wherein A is La, Mg, Ca, Sr or Ba; $A^1$ is La, Ca, Sr or Ba; $A^2$ is Ca, Sr or Ba; $A^3$ is Sr or Ba; $A^4$ is Mg, Ca, Sr, Ba, Ti or Zr; $N^1$ is V, Nb, Ta, Cr, Mo, W, Mn, Si or Ge; $N^2$ is V, Mo, W or Si; x is 1 or 2; y ranges from 1 to 3; and z ranges from 2 to 7. In particular, porous separation layer 12 is composed of titania, and more particularly titania having amorphous, anatase, and metastable phases. The term "continuous," in the context of the present invention, means that porous separation layer 12 covers the surface of porous support 11 so that surface transport effects within the pores of separation layer 12, rather than those of porous support 11 dominate the overall $CO_2$ transport process. In addition, porous separation layer 12 is substantially defect-free, as its median pore size is less than about 10 nm, and is less than about 5 nm in some embodiments. Pore size distribution is narrow to reduce dispersion in Knudsen flow. Defects such as pinholes or cracks allow the fluid stream to bypass separation layer 12, and compromise the selectivity of the membrane. The presence of defects may be inferred from gas flow measurements; by comparing the flow through membrane 100 to that of a bare support 11. Reduction of flow through membrane 100 to less than 10%, and preferably to less than 3% of that of porous support 11 alone typically indicates that porous separation layer 12 is substantially defect-free. Thickness of porous separation layer 12 is less than about 500 nm, particularly less than about 300 nm, and more particularly less than about 100 nm.

Methods and processes for disposing a continuous porous separation layer 12 on a support layer 11 are known in the art; some suitable methods are described by T. Tsuru ("Inorganic porous membranes for liquid phase separation," Separation and Purification Methods, v30 (2), 191-220 (2001)). For example, the support layer may be fabricated using powder sintering with green bodies made from extrusion or tape casting, and the separation layer may be co-cast or co-extruded with the support layer and co-sintered. Alternately, the support layer may be sintered and the separation layer disposed on it in a subsequent processing step. Where the support layer has been prepared in a separate process, the separation layer may be fabricated using a wet chemistry process such as sol-gel techniques or wet impregnation techniques (incipient wetness) including melt infiltration, or vapor deposition process such as electrophoretic deposition, chemical vapor deposition, including metal organic CVD, physical vapor deposition, including evaporation and sputtering, and atomic layer deposition.

In a particular embodiment, membrane 100 is prepared by a process that includes combining at least one titanium alkoxide with water under acid conditions to form a titania sol, and coating the titania sol on a surface of a porous support to form a continuous supported porous titania layer. Suitable titanium alkoxides include titanium tetraalkoxides, particularly titanium $C_1$-$C_8$ tetraalkoxides; and more particularly titanium tetraisopropoxide. At least one template may be additionally combined with the at least one titanium alkoxide to form the titania sol and control porosity in the final structure. The template is a porogenic material, typically a cationic surfactant, that may be removed from the membrane at the end of the fabrication process. Suitable templates include ammonium halides, particularly tetraalkyl ammonium halides, and more particularly tetrapropylammonium bromide. Fractal dimension of the titania sol may be less than about 2.0 when a template is used, or greater than about 2.0 when no template is present. The sol is coated on a surface of a porous support to form a thin gelled film and heat-treated to densify the film and burn out any residual organic material, resulting in a continuous supported porous titania layer.

The final structure of the film may be affected by sol preparation conditions, the coating parameters, and any post-coating processing. The alkoxide reacts in the sol to form particulate or polymeric precursor structures. The continuum from particulate to polymeric structures can be described in terms of a fractal dimension, $D_f$, that corresponds to the density of the structure. Dense particles tend towards a fractal dimension of about 3, while sparser structures have a fractal dimension less than 3. Particulate sols contain relatively dense particles, which form films through the packing of the particles. Porosity is defined by the interstices between the particles. Polymeric structures are more branched and tend to form under conditions where condensation is slower. Polymeric structures with sufficiently low fractal dimension can interpenetrate during film formation leading to denser films. The theoretical limit at which particles are "transparent" to each other is $D_f=1.5$. In this limit, sols tend to form dense films.

In some embodiments, polymeric sols may preferentially form films with controlled microporosity. Compositional variables that may impact the fractal dimension include water content, type and concentration of the alkoxide, and pH. Low concentration of water and alkoxide may result in incomplete hydrolysis and slow condensation. Conversely, high rates of hydrolysis and condensation may lead to the rapid formation of particles. Between these extremes, polymeric or particulate gels may be formed when condensation rates are sufficiently slow to favor the growth of large network-like structures. The addition of small amounts of organic template, up to about 5% wt, may shift the phase boundaries slightly and can generate residual porosity.

Since alkoxide-based sols age with time, it may be desirable to consider the effect of aging time after mixing. Upon mixing, the alkoxides cross-link into oligomers that grow larger with time. In coating porous supports, the sol may be aged so that the average polymeric structure size is larger than the pore size of the support to minimize infiltration. The presence of small quantities of template typically does not impact the dynamic light scattering (DLS) size or growth rate. The fractal dimension of a sol is initially low, owing to the formation of small relatively sparse oligomers. Over time, the continued reaction of the structure with monomers and smaller oligomers may lead to an increase in the fractal dimension. In some embodiments, the presence of a template may cause a slight systematic bias towards smaller fractal dimensions. This may be due to interactions between the template and growing fractal aggregates. To obtain continuous coatings on porous supports, polymeric sols with low fractal dimension but large polymeric size are desired.

Once a sol with the proper structure is obtained, aging may be arrested through dilution with additional solvent. This slows the kinetics of growth by reducing the local concentration of titania precursor particles. Dilution rates up to 1:1 wt. may result in minor reductions in both the DLS size and $D_f$, and interparticle interactions between the sol particles may be important at low dilution rates. At higher dilution rates, the DLS size typically approach a constant value, with the total DLS signal intensity scaling with the dilution rate.

Defects such as pinholes or cracks allow gas flow to bypass the separation layer, compromising the selectivity of the membrane. It is therefore desirable to utilize processing procedures that can produce membranes with sufficiently low defect rates to enable the surface transport effect to dominate the overall transport. The defect rate is defined as the areal fraction of the total membrane support that is left exposed by pinholes or cracks in the film. Since pinholes as small as 100 nm can have a major impact on membrane performance, direct measurement of the defect rate using microscopy is typically not a viable option. Instead, the defect rate may be inferred from gas flow measurements, by comparing the flow through the membrane to that of a bare support.

Defects can form for a variety of reasons, including dust, shrinkage-induced cracking, and cracking due to thermally-induced stresses. The presence of dust on the membrane support during coating may lead to cracks and bare regions in the film. Dust may settle on the membrane before coating, or may be left behind by the coating process. Precautions against dust may include adjusting the coating procedure to include a gentle burst of air on the substrate before coating, and/or coating the film in a class 1000 clean tent. Loss of dust during subsequent processing steps may lead to large pinholes that allow bypass flow through the membrane.

The uniformity of films prepared by spin-coating may be affected by viscosity. During coating, the sol experiences different shear rates as a function of radial position. For sols with Newtonian behavior, the viscosity is independent of shear rate and a uniform film was possible. However, high concentrations of polymeric structures in the sol may lead to non-Newtonian behavior which, in turn, may produce radial variations in thickness during coating. Another viscosity-related artifact of spin-coating is the formation of striations. Both types of variations in the coating thickness may lead to inhomogeneities in the film density during evaporation, resulting in pinholes, or mechanical stresses in the film during subsequent processing steps, which resulted in cracks. Both effects may be reduced by dilution of the sol. For example, a suitable dilution rate may be 1 g sol to 1.2 g isopropanol, as determined by visual inspection of films spin-coated onto silicon wafers. Higher dilution rates may be used to further arrest the growth of the sols through a concentration effect, but films prepared from these sols may be thinner, exacerbating the problem of cracking in areas where the underlying substrate surface roughness was larger than the film thickness.

Use of an intermediate layer on the porous support may facilitate consistent flow reduction. Physically, the role of the intermediate layer is two-fold. First, it may reduce the average roughness of the support, preventing crack formation in areas where the variations in surface roughness are comparable to the average thickness of the porous separation layer. Second, it may reduce the average pore size of the support. Since a minimum sol particle size may prevent infiltration of the sol into the support, the intermediate layer may increase the range of sols conditions suitable for coating. In addition, use of an intermediate layer may also increase the yield of defect-free samples. The intermediate layer may be composed of titania, alumina, silica, zirconia, stabilized zirconia or a combination thereof, particularly alumina.

In the absence of an intermediate layer, infiltration may be minimized by aging the sol used for the first coat to a point where the average particle size exceed the average pore size in the support. In effect, the first coating acts as an intermediate layer. Due to the dilution requirements needed to obtain uniform films, the first coatings may be too thin to consistently mask the underlying surface roughness of the support, and multiple coating steps may be desirable.

EXAMPLES

Example 1

Membranes Prepared from Sol with Porogen and Low Fractal Dimension

A sol was prepared by combining a solution containing tetrapropylammonium bromide (TPABr), water ($H_2O$), nitric acid ($HNO_3$), and isopropanol (IPA) in the molar ratio: 1:185: 1.5:740, and a solution containing titanium isopropoxide (TIIP) in isopropanol (IPA) in the molar ratio: 1:7.2. The first solution was added dropwise to the second solution under vigorous stirring over a five minute period to produce a solution with molar composition: 1 TPABr:185$H_2O$:1.5 $HNO_3$: 103 TIIP:1500 IPA. In a typical experiment, each solution was prepared on a 10 g IPA basis and combined to produce a solution with 20 g total IPA.

The resulting sol was filtered to remove dust and other particulates, aged for an additional two to twenty minutes, and diluted in isopropanol at a rate of 1 g sol to 1.5 g isopropanol. Dynamic light scattering measurements indicated the nominal particle size was between 3 and 6 nm. Small angle x-ray scattering (SAXS) measurements indicated that the fractal dimension was between 1.4 and 1.6. The SAXS technique for determining fractal dimension has been described by Elferink and coworkers (W. J. Elferink, K. Keizer, H. Verweij, *J. Colloid and Interface Sci.*, 178, 565-570 (1996); W. J. Elferink, B. N. Nair, R. M de Vos, K. Keizer, H. Verweij, *J. Colloid and Interface Sci.*, 180, 127-134 (1996)).

Membranes were prepared by spin-coating the aged, diluted sol onto a porous alumina substrate, followed by aging, and firing to densify the film. Each coat was applied at a spin rate of 4000 rpm, followed by aging for between 1 and 4 hours in a closed humidity chamber at room temperature with relative humidity between 30 and 70%, and calcination in air between 250 and 450° C. for 2 h. The support comprised two layers—a thick support layer having large pores ranging from about 10 to about 40 nm, formed by the consolidation of ~200 nm $\alpha$-$Al_2O_3$ particles and a thinner $\gamma$-$Al_2O_3$ intermediate layer (100 nm to 3 um) with pores in the 1-5 nm range formed from ~30 nm boehmite particles. The $\gamma$-alumina intermediate layer was applied to the base alumina support to reduce defects and increase the range of sols suitable for coating. The respective layer thicknesses of the support, intermediate layer, and titania film were about 250 μm, 200-600 nm and 100 nm. The titania layer was formed by two successive coating steps, followed by aging for between one and four hours in a closed humidity chamber at room temperature with relative humidity between 30 and 70%, and calcination in air at 400° C. for 2 hours to remove the organic template and densify the titania film. Thermogravimetric analysis (TGA) of the relative mass loss as a function of temperature showed gradual mass loss up to about 250° C. corresponding to the loss of solvent and water. Organic burnout began at around 300° C. with the bulk of the TPABr loss occurring between 340 and 350° C. Mass loss continued, through about 450° C., albeit at a slower rate. Visually, samples calcined at 375° C. had a slight brownish tint while samples heated at 400° C. were white in appearance.

X-ray diffraction (XRD) scans of the membranes heated to 400° C. showed the onset of crystallization in the titania films. The amorphous-anatase crystallization is known to occur between about 350 and 500° C., depending on the processing conditions. Crystallization was confirmed by TEM examination of the titania film. Low resolution imaging revealed some darker regions, corresponding to the onset of crystallization to the anatase phase. Although high resolution TEM imaging showed reduced density in the immediate vicinity of the nanocrystallites, there was no evidence of microcracks, suggesting that the structural integrity of the film remained intact.

Gas separation performance measurements were obtained by measuring the gas permeation behavior of pure (He, $CO_2$) and mixed gases (50% $H_2$/$CO_2$ and 50% He/$CO_2$) through the membrane. The samples were mounted using silicone gaskets in a stainless steel fitting. Gas flow and composition were measured at upstream pressures ranging from 5 to 15 psig. Measurements were obtained while heating the sample from room temperature to 250° C. Data from multiple heating cycles were compared to confirm the stability of the samples.

The best membrane prepared under these conditions had a room temperature $CO_2$/$H_2$ selectivity of 2.5. Upon heating this declined to 0.5 at 250° C., which is about 2.5 times the value expected for Knudsen selectivity. The sample showed a monotonic $CO_2$ permeance increase of 40% from RT to 250° C. Average samples had average $CO_2$/$H_2$ selectivities of 2.2 (stdev 0.2) at RT and 0.38 (stdev 0.08) at 250° C., and exhibited a $CO_2$ permeance increase of 49% (stdev 6%) from RT to 250° C.

Example 2

Membranes Prepared from Sol with High Fractal Dimension without Porogen; No Intermediate Layer Film The samples were prepared as above, with the following changes: no TPABr was used in the first solution, the solution was aged for over 90% of the gel time, and aging time was 2 to 20 days. The solution was then diluted at a rate of 1 g sol to 10 or 20 g IPA.

A two coat membrane was prepared on a substrate with no alumina intermediate layer. The substrate was composed of a thick layer (>50 um) of alumina with large pores in the nominal size range of 10 to 40 nm. The resulting membranes typically had the following structure:

$TiO_2$ layer, thickness 50-500 nm, pore size <1 nm (In some cases, two layers, amorphous $TiO_2$ over nanocrystalline $TiO_2$.)

$Al_2O_3$ support layer, thickness 200 nm, pore size ~20 nm

The best membrane prepared under these conditions had a room temperature $CO_2$/$H_2$ selectivity of 2.0. Upon heating this declined to 0.41 at 250° C., which is about 2.0 times the value expected for Knudsen selectivity. The sample showed a monotonic $CO_2$ permeance increase of 30% from RT to 250° C. Average samples had average $CO_2$/$H_2$ selectivities of 1.7 (stdev 0.07) at RT and 0.35 (stdev 0.04) at 250° C., and exhibited a $CO_2$ permeance increase of 46% (stdev 13%) from RT to 250° C.

Example 3

Baselines and Benchmarks

Figure 3:
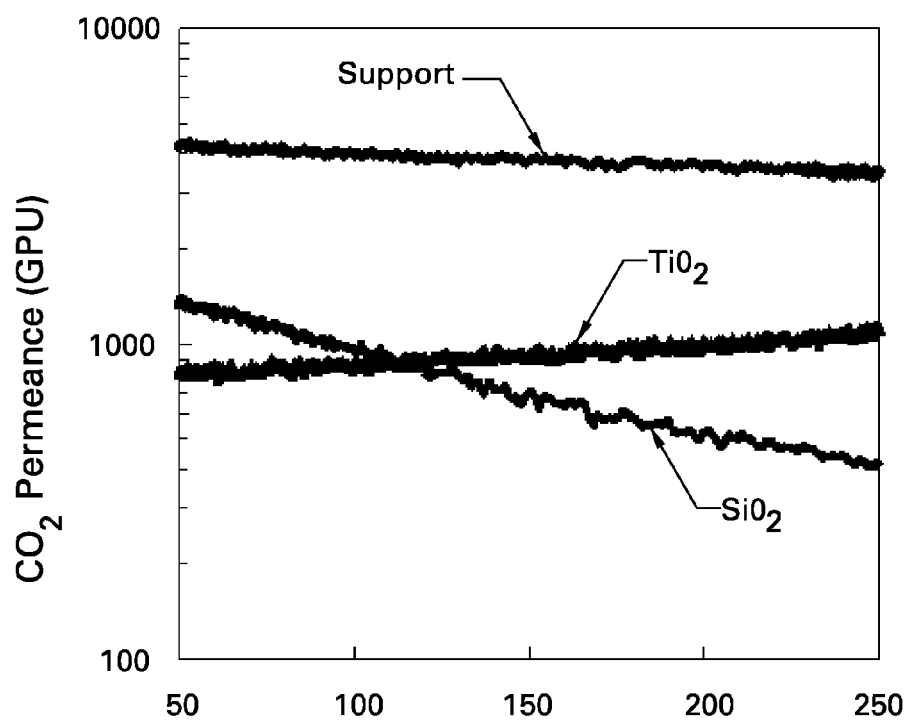
FIG. 3 is a graph showing $CO_2$ transport through a supported silica membrane, a supported titania membrane, and an uncoated support. The units of permeance are Gas Permeation Units (GPU) where 1 GPU=3.3e−10 mol/m²/Pa/s.

FIG. 3 shows the $CO_2$ transport through a supported silica membrane, a supported titania membrane, and an uncoated support for an equimolar $CO_2$—$H_2$ gas mixture. Both membranes showed a reduction in $CO_2$ permeance of almost an order of magnitude relative to the support confirming that the deposited film controls gas transport through the membrane. However, the temperature trends indicated drastically different mechanisms for $CO_2$ transport. The $CO_2$ permeance through the bare support decreased with increasing temperature, as expected for Knudsen flow. The ratio of permeances at 250° C. and 50° C. is 0.77, which agreed with the expected ratio of 0.79 for Knudsen behavior. The $CO_2$ permeance through the silica membrane also decreased with temperature, but at a higher rate than through the bare support. At low temperatures, a large portion of the $CO_2$ transport through silica at was due to surface transport. The weakening of this mechanism at higher temperatures explains the faster rate of decline in $CO_2$ flow with temperature, and is in reasonable agreement with the model prediction.

In contrast, the $CO_2$ permeance for a supported titania film increased with temperature, due to the surface transport effect. For a set of 3 samples heated from 50 to 250° C., the measured $CO_2$ permeance showed an average enhancement of 49% with a standard deviation of 6%. This is compared to the 21% decrease expected if the $CO_2$ transport was due entirely to Knudsen diffusion. The enhancement in surface flow depends on the relative contributions from surface transport and Knudsen diffusion. If the total $CO_2$ transport at 50° C. is dominated by surface flow, then the enhancement in surface transport is the same as the measured enhancement.

Example 4

$CO_2/H_2$ Selectivity

Figures 4, 5:
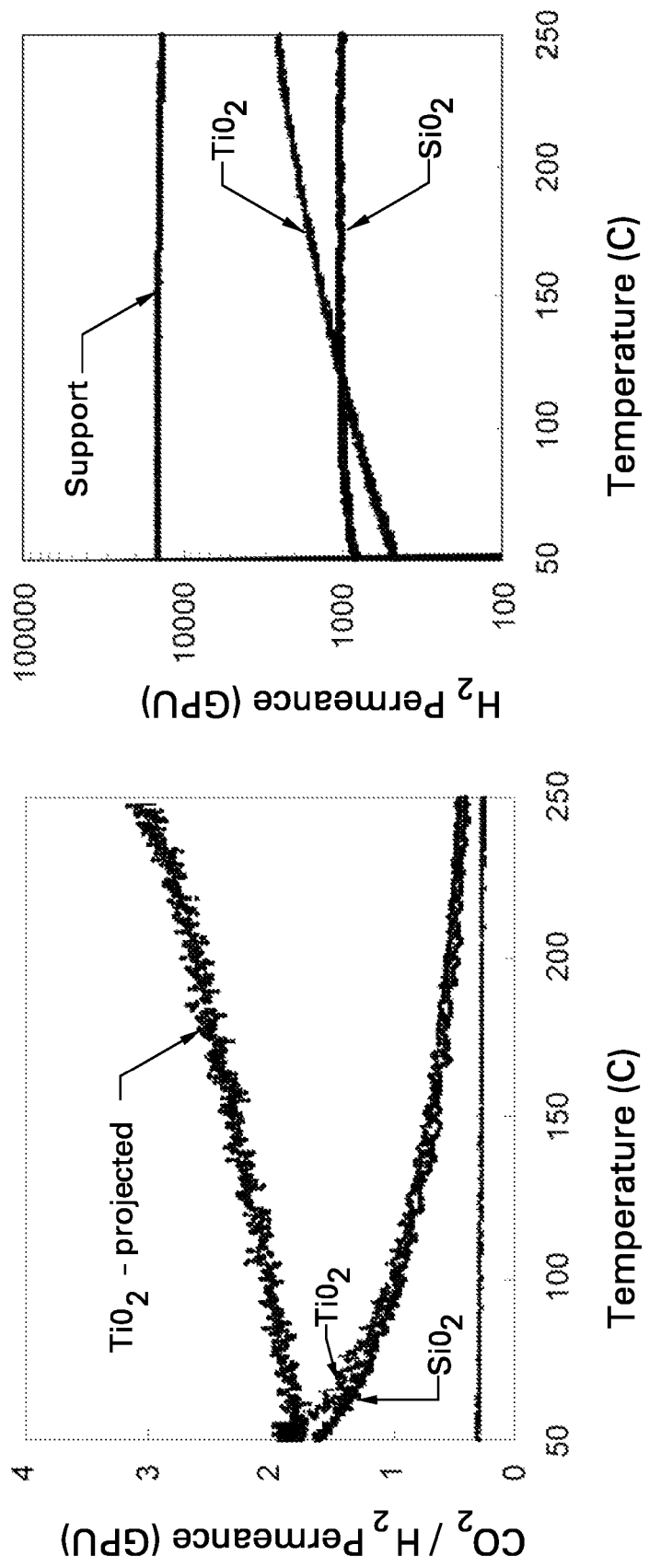
FIG. 4 is a graph showing $CO_2/H_2$ selectivity for various membranes as a function of temperature.
FIG. 5 is a graph showing $H_2$ permeance of various membranes.

The $CO_2/H_2$ selectivity for the membranes as a function of temperature is shown in FIG. 4. The selectivity of the bare support remained constant at 0.21, the value expected for Knudsen diffusion, over the temperature range of interest. For both silica and titania membranes, the selectivity dropped with increasing temperature, but for different reasons. This can be seen by comparing the relative trends in the $CO_2$ and $H_2$ permeances. In silica, the selectivity declined from about 1.6 at 50° C. to 0.4 at 250° C. because of a reduction in $CO_2$ transport, while the $H_2$ permeance remained relatively stable. This can be understood in terms of the desorption of $CO_2$ from the silica pores as the temperature is increased. Desorption of $CO_2$ eliminated the $CO_2$ transport enhancement over Knudsen behavior and unblocked the pores, allowing additional $H_2$ flow. This, in turn, compensated for the expected reduction due to the Knudsen temperature dependence, explaining the slight increase in $H_2$ permeance around 100° C.

In titania membranes, the selectivity dropped from about 2 at 50° C. to 0.5 at 250° C., despite the increased $CO_2$ permeance with temperature. This was due to an unexpected increase in $H_2$ permeance. The temperature trend was consistent with an activated process and a log permeance vs. 1/T fit gave activation energies ranging from 10 to 13 kJ/mol. This compares favorably with the activation energies reported for $H_2$-selective microporous silica prepared without templates. The simultaneous increase in both $CO_2$ and $H_2$ permeance suggested a multimodal pore size distribution in the titania membranes comprising a set of larger pores produced by the TPABr template which accounted for the enhanced $CO_2$ transport through surface diffusion and a population of smaller pores which selectively permeated $H_2$ via a size exclusion mechanism. By analogy to silica membranes prepared without templates, the smaller pores were readily formed as a consequence of the sol-gel processing. To test this hypothesis, titania membranes were prepared from sols without TPABr. Preliminary results indicated an increasing $H_2$ trend, without enhancement of $CO_2$ transport upon heating. FIG. 4 also shows the projected selectivity in a titania membrane with the measured $CO_2$ permeance trend; FIG. 5 shows a projected $H_2$ permeance consistent with Knudsen diffusion trend. In this limit, the $CO_2/H_2$ selectivity is expected to increase from 2 to 3 upon heating from 50° C. to 250° C.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for separating carbon dioxide from a fluid stream comprising carbon dioxide and hydrogen with selectivity higher than Knudsen diffusion selectivity, said method comprising contacting a porous membrane with the fluid stream at a temperature greater than about 200° C., the porous membrane comprising a porous support and a continuous porous separation layer disposed on a surface of the porous support and extending between the fluid stream and the porous support layer;

wherein the porous support comprises alumina, silica, zirconia, stabilized zirconia, stainless steel, titanium, nickel-based alloys, aluminum-based alloys, zirconium-based alloys or a combination thereof;

the porous separation layer comprises titania, MgO, CaO, SrO, BaO, $La_2O_3$, $CeO_2$, $HfO_2$, $Y_2O_3$, $VO_z$, $NbO_z$, $TaO_z$, $ATiO_3$, $AZrO_3$, $AAl_2O_4$, $A^1FeO_3$, $A^1MnO_3$, $A^1CoO_3$, $A^1NiO_3$, $A^2HfO_3$, $A^3CeO_3$, $Li_2ZrO_3$, $Li_2SiO_3$, $Li_2TiO_3$, $Li_2HfO_3$, $A^4N^1{}_yO_z$, $Y_xN^1{}_yO_z$, $La_xN^1{}_yO_z$, $HfN^2{}_yO_z$, or a combination thereof;

median pore size of the porous separation layer is less than about 10 nm; and

A is La, Mg, Ca, Sr or Ba;
$A^1$ is La, Ca, Sr or Ba;
$A^2$ is Ca, Sr or Ba;
$A^3$ is Sr or Ba;
$A^4$ is Mg, Ca, Sr, Ba, Ti or Zr;
$N^1$ is V, Nb, Ta, Cr, Mo, W, Mn, Si or Ge;
$N^2$ is V, Mo, W or Si;
x is 1 or 2;
y ranges from 1 to 3; and
z ranges from 2 to 7.

2. A method according to claim 1, wherein the porous separation layer comprises titania.

3. A method according to claim 2, wherein the titania of the porous separation layer comprises amorphous, anatase, metastable phases, or a combination thereof.

4. A method according to claim 1, wherein the porous membrane comprises an intermediate layer disposed between the porous support and the continuous porous separation layer.

5. A method according to claim 4, wherein the intermediate layer comprises alumina.

6. A method according to claim 1, wherein the porous support comprises alumina.

7. A method according to claim 1, wherein median pore size of the porous separation layer is less than about 5 nm.

8. A method according to claim 1, wherein thickness of the porous separation layer is less than about 500 nm.

9. A method according to claim 1, wherein thickness of the porous separation layer is less than about 300 nm.

10. A method according to claim 1, wherein thickness of the porous separation layer is less than about 100 nm.

11. A method according to claim 1, wherein $CO_2$ permeance of the porous membrane is greater than $10^{-8}$ mol/m²/Pa/s at 200° C.

12. A method according to claim 1, wherein $CO_2$ permeance of the porous membrane is greater than $10^{-7}$ mol/m²/Pa/s at 200° C.

13. A method for separating carbon dioxide from a fluid stream comprising carbon dioxide and hydrogen, with selectivity higher than Knudsen diffusion selectivity, said method comprising contacting a porous membrane with the fluid stream at a temperature greater than about 200° C., the porous membrane prepared by a process comprising
    combining at least one titanium alkoxide with water under acid conditions to form a titania sol; and
    coating the titania sol on a surface of a porous support to form a continuous supported porous titania layer;
    wherein the porous support comprises alumina, silica, zirconia, stabilized zirconia, stainless steel, titanium, nickel based alloys, aluminum-based alloys, zirconium-based alloys or a combination thereof.

14. A method according to claim 13, wherein at least one template is additionally combined with the at least one titanium alkoxide to form the titania sol.

15. A method according to claim 14, wherein the template is an ammonium halide.

16. A method according to claim 14, wherein the template is tetrapropylammonium bromide.

17. A method according to claim 14, wherein fractal dimension of the titania sol is less than about 2.0.

18. A method according to claim 13, wherein fractal dimension of the titania sol is greater than about 2.0.

19. A method according to claim 13, wherein the titania layer comprises amorphous, anatase, metastable phases, or a combination thereof.

20. A method according to claim 13, wherein median pore size of the titania layer is less than about 5 nm.

* * * * *